United States Patent [19]

Finch et al.

[11] Patent Number: 5,184,883
[45] Date of Patent: Feb. 9, 1993

[54] AUTOMOBILE LIGHTING SYSTEM THAT INCLUDES AN EXTERIOR INDICATING DEVICE

[75] Inventors: William W. Finch, Ann Arbor, Mich.; John M. Davenport, Lyndhurst; Richard L. Hansler, Pepper Pike, both of Ohio

[73] Assignee: General Electric Company, Schenectady, N.Y.

[21] Appl. No.: 877,493

[22] Filed: May 1, 1992

[51] Int. Cl.⁵ ............................................. F21V 7/04
[52] U.S. Cl. ..................................... 362/32; 362/61; 362/321; 362/351
[58] Field of Search ............... 362/32, 83.3, 61, 321, 362/351; 340/475, 471

[56] References Cited

U.S. PATENT DOCUMENTS

| | | | |
|---|---|---|---|
| 2,338,748 | 1/1944 | Watkiss | 362/32 X |
| 4,868,718 | 9/1989 | Davenport et al. | 362/32 |
| 4,949,227 | 8/1990 | Finch et al. | 362/32 X |
| 5,006,965 | 4/1991 | Jones | 362/32 |

Primary Examiner—Allen M. Ostrager
Attorney, Agent, or Firm—George E. Hawranko; Stanley C. Corwin

[57] ABSTRACT

In this automobile lighting system there is (i) a light source that develops light when in an "on" state, (ii) an elongated light guide that has an input end for receiving light from the source and an output end to which this light is transmitted by the light guide, (iii) an indicating device at the output end for controlling the passage of light from the output end to a location exterior to the automobile, and (iv) a lens located between the indicating device and the exterior location for receiving light passing through the indicating device from the light guide output end. The indicating device comprises a shutter having an opaque portion, a light blocking position in which the opaque portion blocks the passage of light from the output end to the lens, and a non-blocking position in which light is allowed to pass through the indicating device to the lens. The indicating device also includes shutter-actuating means for shifting the shutter between its light-blocking position and its non-blocking position while the light source remains in its "on" state.

8 Claims, 5 Drawing Sheets

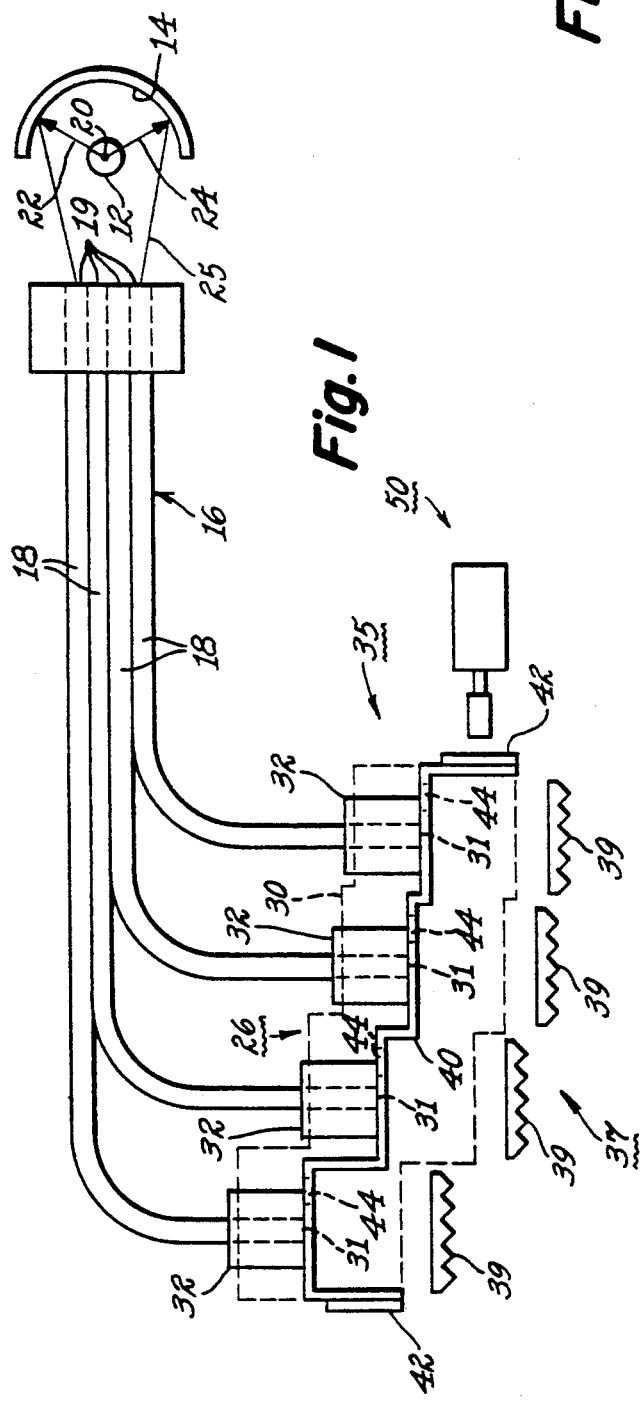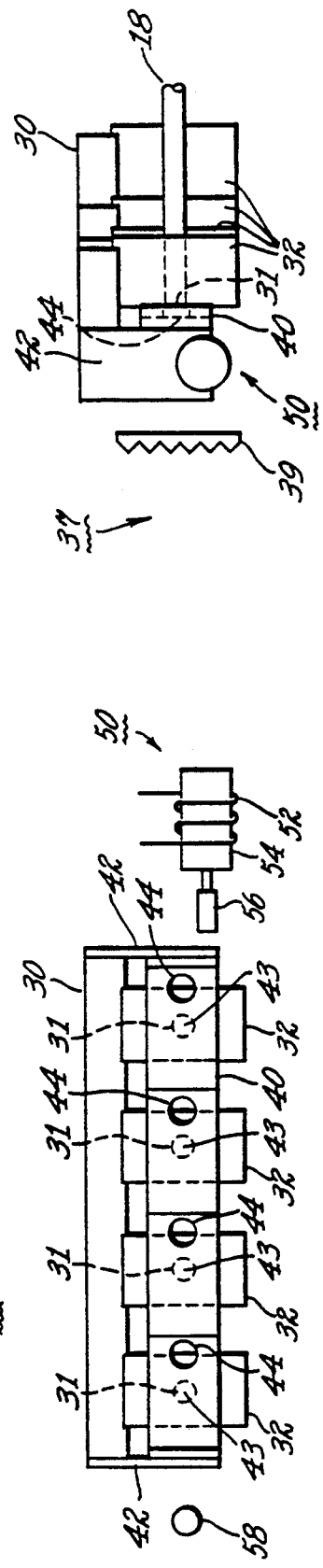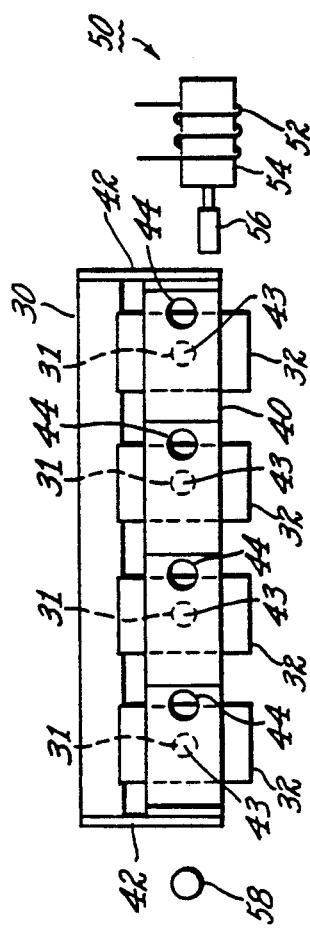

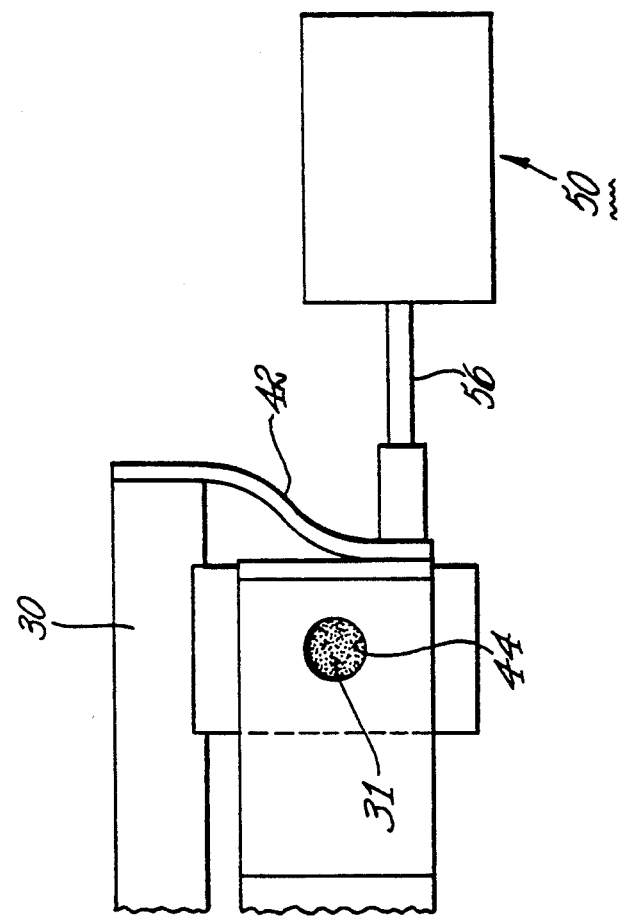

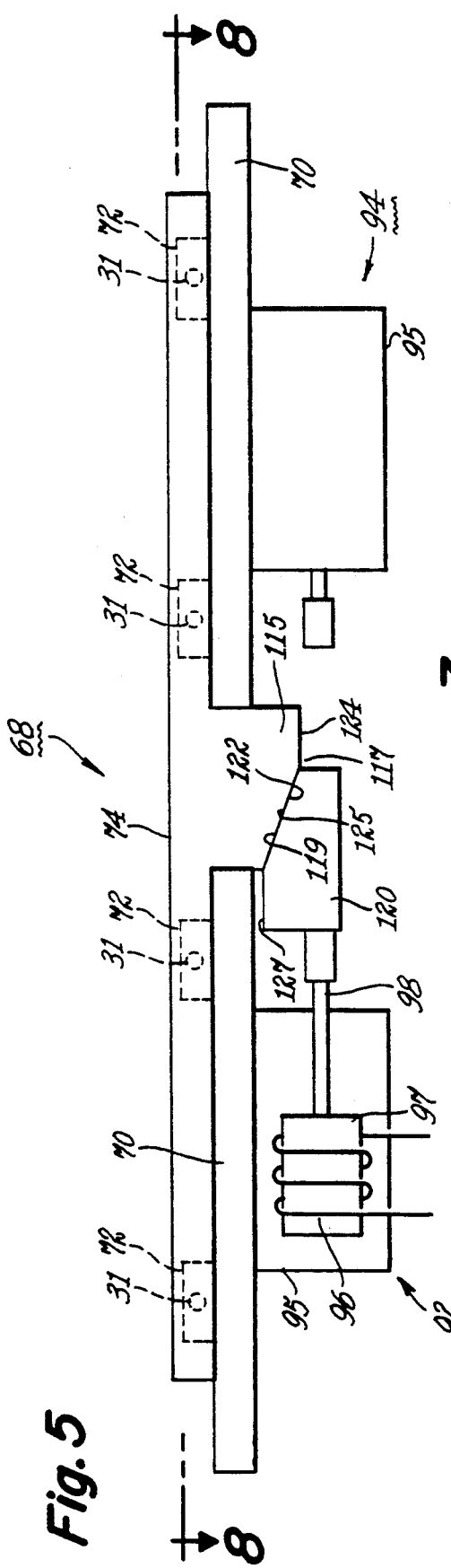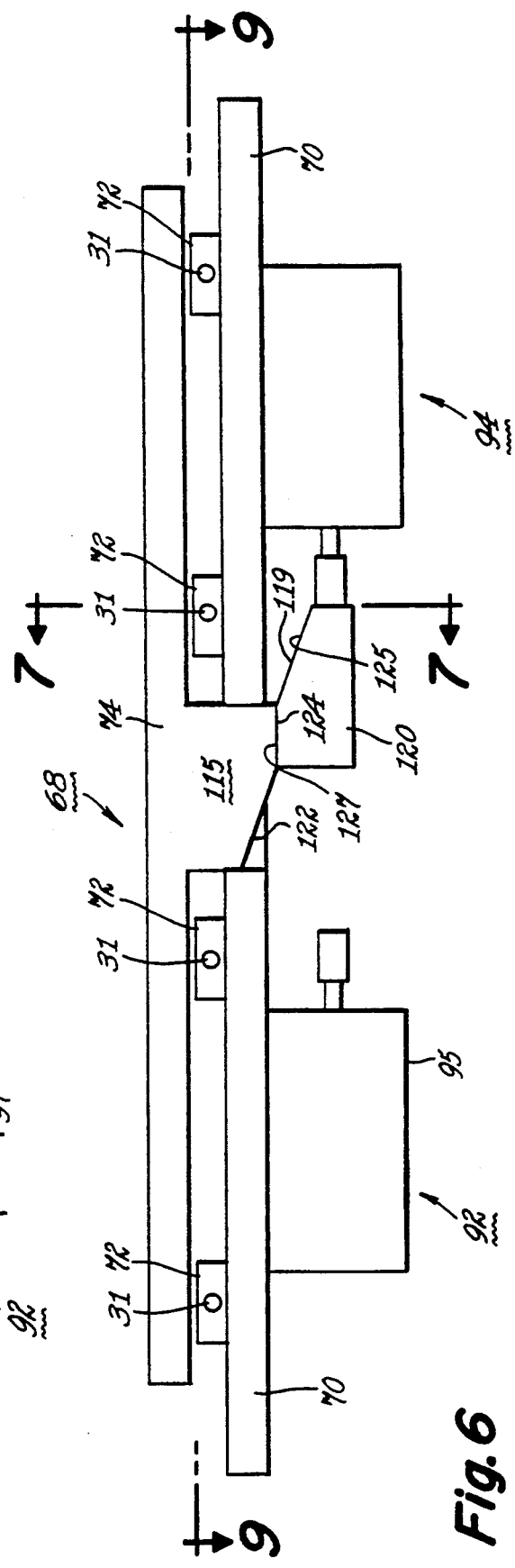

AUTOMOBILE LIGHTING SYSTEM THAT INCLUDES AN EXTERIOR INDICATING DEVICE

TECHNICAL FIELD

This invention relates to an automobile lighting system that comprises an exterior indicating device for the automobile, such as a turn-signal indicator, a flasher-type emergency indicator, a side marker, or a brake-light indicator, and, more particularly, relates to a lighting system of this type that also comprises a light source that operates essentially continuously while the indicating device is turned off and on.

BACKGROUND

The type of automobile lighting system that we are concerned with comprises: a light source that operates essentially continuously, an elongated light guide for transmitting light from the source to an output location spaced from the source, and a lens at the output location for receiving light from the light guide and transmitting such light to a location exterior to the automobile. The system also includes an indicating device that controls the light delivered to the lens, thereby providing a light signal that serves as an external indication to others of the driver's intentions or of the status or position of the automobile.

It is possible to use for the indicating device of such a system a solid-state in-line switch in the light guide for controlling the light passing therethrough, but such switches typically leave something to be desired in terms of efficiency and contrast ratio. We are concerned with providing an indicating device for use in such a system that is highly efficient and provides very high contrast ratio, i.e., the ratio of light output from the device when in an "on", or non-blocking, state to light output from the device when in an "off", or blocking, state.

SUMMARY

In carrying out our invention in one form, we provide an automobile lighting system that includes a light source that develops light when in an "on" state, an elongated light guide for transmitting light from the source to an output location spaced from the source, and a lens at the output location for receiving light from the light guide. The system further includes at the output location an indicating device that comprises a shutter having (a) a light-blocking position in which a substantially opaque portion of the shutter blocks the passage of light from the output end of the light guide to the lens and (b) a non-blocking position in which light is allowed to pass through said indicating device from said output end to the lens. The indicating device further comprises shutter-actuating means for shifting the shutter between said light-blocking position and said non-blocking position while the light source remains in said "on" state.

In one form of the invention the indicating device is an automobile turn-signal indicator or a flasher-type emergency indicator, and in another form it is a side marker or a brake-light indicator for the automobile. In the one form of the invention, the shutter-actuating means comprises spring means biasing the shutter toward its light-blocking position and an actuator that, when enabled, operates the shutter into its non-blocking position against the bias of the spring means. Shortly after the shutter has entered its non-blocking position, the actuator is disabled, allowing the spring means to return the shutter to its light-blocking position. This motion of the shutter between blocking and non-blocking positions is repeated for as long as the driver desires, thus causing the lens to transmit to the exterior the characteristic flashing light associated with a turn-signal indicator.

In the other form of the invention, the shutter-actuating means comprises two actuators, a first one of which, when enabled, supplies force for driving the shutter from its light-blocking position toward its non-blocking position and a second one of which, when enabled, effects return of the shutter from its non-blocking position into its light-blocking position. Force-transmitting means operable by either of the two actuators (i) applies force from the first actuator to the shutter to drive the shutter from its light-blocking to its non-blocking position when the first actuator is enabled and (ii) holds the shutter in its non-blocking position when the first actuator is disabled. This force-transmitting means also acts when operated by the second actuator upon enablement to allow return of the shutter from its non-blocking position to its light-blocking position.

BRIEF DESCRIPTION OF FIGURES

For a better understanding of the invention, reference may be had to the following detailed description taken in connection with accompanying drawings, wherein:

FIG. 1 is a schematic illustration of an automobile lighting system comprising an indicating device 35, e.g., a turn-signal indicator, (shown in plan view) and a plurality of lenses adjacent the indicating device.

FIG. 2 is a front view of the indicating device of FIG. 1, with the lenses of FIG. 1 removed for clarity. In FIG. 2 the indicating device is in its light-blocking condition.

FIG. 3 is a side view of the indicating device of FIG. 2.

FIG. 4 is a front view of a portion of the indicating device of FIGS. 1-3. FIG. 4 is similar to FIG. 2 except that in FIG. 4 the indicating device is in a non-blocking condition.

FIG. 5 is a schematic front view of another type of indicating device, e.g., a side marker. The device is shown in a light-blocking condition.

FIG. 6 is a schematic front view of the indicating device of FIG. 5 showing the indicating device in a non-blocking condition that allows light to pass therethrough.

DETAILED DESCRIPTION OF EMBODIMENTS

Figure 7:
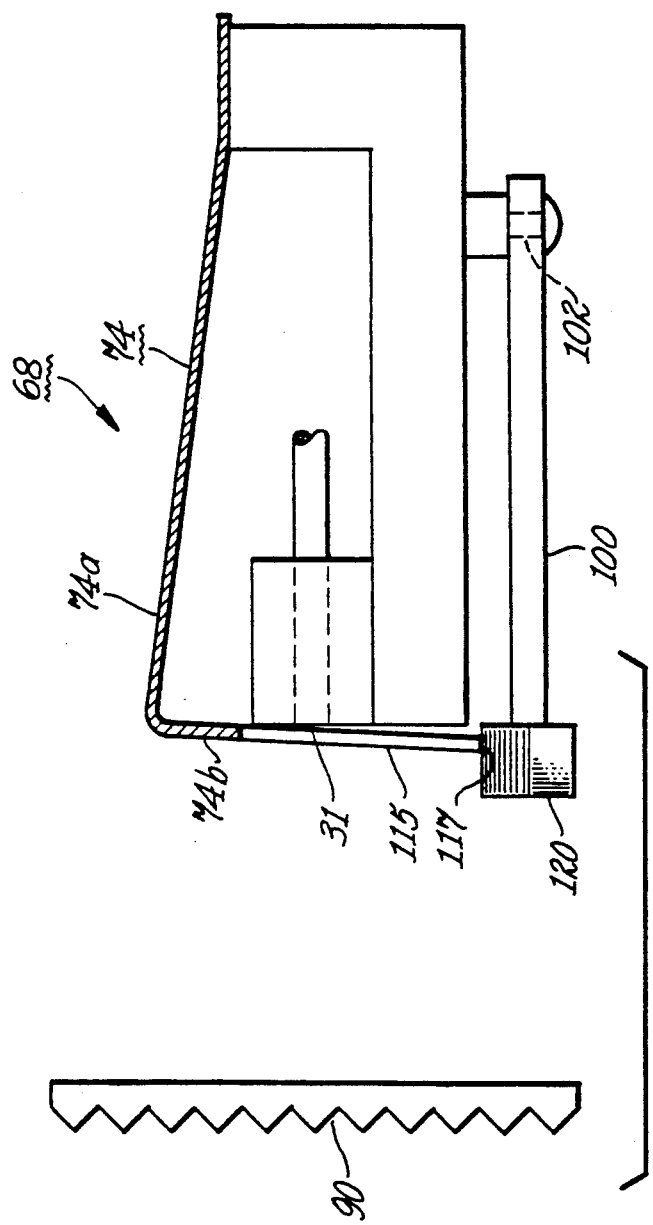
FIG. 7 is a sectional view taken along the line 7—7 of FIG. 6.

Referring first to FIG. 1, the automobile lighting system depicted therein comprises a light source 12, a reflector 14, and a bundle 16 of elongated light guides 18, each having an input end 19 facing the reflector. In a preferred form of the invention, this input portion 12–19 of the system is similar to that disclosed in U.S. Pat. No. 4,811,172—Davenport et al, assigned to the assignee of the present invention; and, accordingly, the reflector 14 is of an ellipsoidal configuration, the central portion of the light source 12 is located at one focal point 20 of the ellipsoidal reflector, and the input end of the bundle 16 is located adjacent the other focal point of the ellipsoidal reflector. Light rays emitted by the source, such as rays 22 and 24, are intercepted and reflected by the reflector 14 and enter the exposed faces, or input ends 19, of the light guides 18 within the confines of an imaginary truncated cone 25 depicted in FIG. 1.

The elongated light guides 18, which are preferably optical fibers, extend from their input ends to an output location 26 spaced from the light source 12. At the output location there is a base plate 30 shown in phantom in FIG. 1 that supports the output ends 31 of the light guides 18 through coupling sleeves 32 respectively surrounding the light guides and appropriately fixed to the lower side of the base plate. The light guides 18 act in a well-known manner to transmit the light received at their input ends 19 to their output ends 31.

At the output ends 31 of the light guides, there is an indicating device 35 for controlling the passage of light from the output ends to a location 37 exterior to the automobile. In addition, there are lenses 39 located between the indicating device 35 and the exterior location 37 for receiving and appropriately scattering and coloring light passing through the indicating device from the light guide output ends 31.

In the embodiment of the FIGS. 1-3, the indicating device 35 takes the form of a turn-signal indicator or a flasher-type emergency indicator for the automobile. This indicator comprises a horizontally-movable mask, or shutter, 40 of plate form which extends across the output ends 31 of the light guides in close proximity to the output ends. This shutter 40 is suspended from the base plate 30 by two leaf springs 42 respectively located at opposite ends of the shutter 40. In FIG. 2 the shutter 40 is illustrated as being in a light-blocking position with respect to light passing through the output ends 31 of the light guides. More specifically, the shutter contains opaque portions 43 which are aligned with and cover the output ends 31 of the light guides when the shutter is in its position of FIG. 2. When the shutter is in its position of FIG. 2, these opaque portions 43 block light from passing from the output ends of the light guides to the exterior 37 of the automobile. The shutter 40 is movable to the left from its light-blocking position of FIG. 2 into a non-blocking position (shown in FIG. 4) where it allows light to pass therethrough. In this regard, the shutter contains a plurality of apertures 44 (one for each of the illustrated light guides) which are located in laterally-spaced relation to the output ends of the light guides when the shutter is in its light-blocking position of FIG. 2. When the shutter is shifted to the left into its non-blocking position of FIG. 4, these apertures 44 are moved into alignment with the output ends 31, thus allowing light to pass via the apertures from the light guides through the shutter and to the lenses 39. The lenses transmit this light to the exterior 37, scattering and coloring it in an appropriate desired manner.

For shifting the shutter 40 from its light-blocking position of FIG. 2 into its non-blocking position of FIG. 4, an actuator 50 is provided. In the illustrated embodiment, actuator 50 is a solenoid type actuator, but it is to be understood that other suitable types of actuators, such as conventional hydraulic or vacuum actuators, could instead be utilized. Referring to FIG. 2, the illustrated actuator comprises a coil 52, an armature 54, and a plunger 56 attached to the armature. When the coil 52 is energized, it develops a magnetic field that drives the armature 54 to the left, causing the left-hand end of plunger 56 to engage the leaf spring 42 and thereafter to transmit leftward motion from the armature to the shutter against the opposing bias of the leaf springs 42. Such motion continues until the shutter engages a suitable stationary stop 58. When this occurs, the apertures 44 are aligned with the output ends 31 of the light guides, thus allowing light from the output ends to pass through apertures 44 and then on to the lenses 39. After the shutter has remained in its non-blocking position for a brief interval, the coil 52 of the solenoid is deenergized, thereby disabling the solenoid and allowing the deflected leaf springs to discharge and return the shutter to its light-blocking position of FIG. 2. After a brief period, the above-described series of events is repeated. Such repetition continues so long as the solenoid coil 52 is energized and deenergized in this manner. The net effect of the shutter's being repetitively shifted as above described between its blocking and non-blocking position is that light from the light guides is intermittently allowed to reach the lenses 39, thus producing the characteristic repetitively flashing light of a turn-signal indicator or a flasher-type emergency indicator.

It will be noted that the illustrated shutter 40 is of a stepped configuration as seen in the plan view of FIG. 1. The purpose of this configuration is to allow the shutter configuration to follow the front end contour of an aerodynamically designed vehicle. To accommodate this stepped configuration of the shutter, the outer ends of the light guides are located in horizontally staggered positions as seen in FIG. 2, thus enabling them to be located in close proximity to the shutter.

In FIGS. 5-9, another form of the invention is illustrated, specifically a side marker or a brake-light indicator 68 for an automobile. In one embodiment, this side marker or indicator 68 forms a part of the same lighting system as depicted in FIG. 1. That is, light guides 18 forming a part of the bundle 16 of FIG. 1 are routed to the side marker or indicator 68 to allow the side marker or indicator to utilize light from the source 12 of FIG. 1. The side marker or indicator of FIGS. 5-9 comprises a stationary base plate 70 on which the output ends 31 of the light guides 18 are mounted by coupling sleeves 72 respectively surrounding the light guides and fixed to the base plate. Also mounted on the base plate is a shutter 74 of L-shaped cross-sectional configuration as shown in FIG. 7. Referring to FIG. 7, this L-shaped shutter 74 comprises a generally horizontally-extending first leg portion 74a that is attached at its right-hand end to the base plate 70 and a generally vertically-extending second leg portion 74b at the front end of the shutter that is normally positioned in front of the output ends 31 of the light guides when the shutter is in its light-blocking position of FIG. 5. The shutter 74 is preferably made of thin sheet metal that makes the horizontally-extending leg portion 74a flexible and resilient so that this leg portion acts as a leaf spring that is deflected when the shutter is lifted into its non-blocking position of FIGS. 6 and 7. In its position of FIG. 5, the shutter acts to block the passage of light through the indicating device 68 since the leg 74b of the shutter is opaque and is in close proximity to the output ends of the light guides. But when the shutter is lifted into its non-blocking position of FIGS. 6 and 7, the leg 74b is positioned in a non-blocking position above the output ends 31 of the light guides, thus allowing light to pass without interference from these output ends 31 to the exterior 37 of the automobile via a lens 90 positioned between the indicating device 68 and the exterior.

For shifting the shutter between its light-blocking position of FIG. 5 and its non-blocking position of FIGS. 6 and 7, two solenoid-type actuators 92 and 94 are provided. Each of these actuators includes a stationary housing 95 fixed to base plate 70 at the lower side of the base plate, a stationary coil 96 within the housing, a movable armature 97 surrounded by the coil, and a plunger 98 fixed to the armature. When the coil 96 of the left-hand actuator 92 is energized, it develops a magnetic field that drives its armature 97 and plunger 98 horizontally toward the right. When the coil 96 of the other actuator 94 is energized, it develops a magnetic field that drives its armature and plunger horizontally toward the left.

Figure 8:
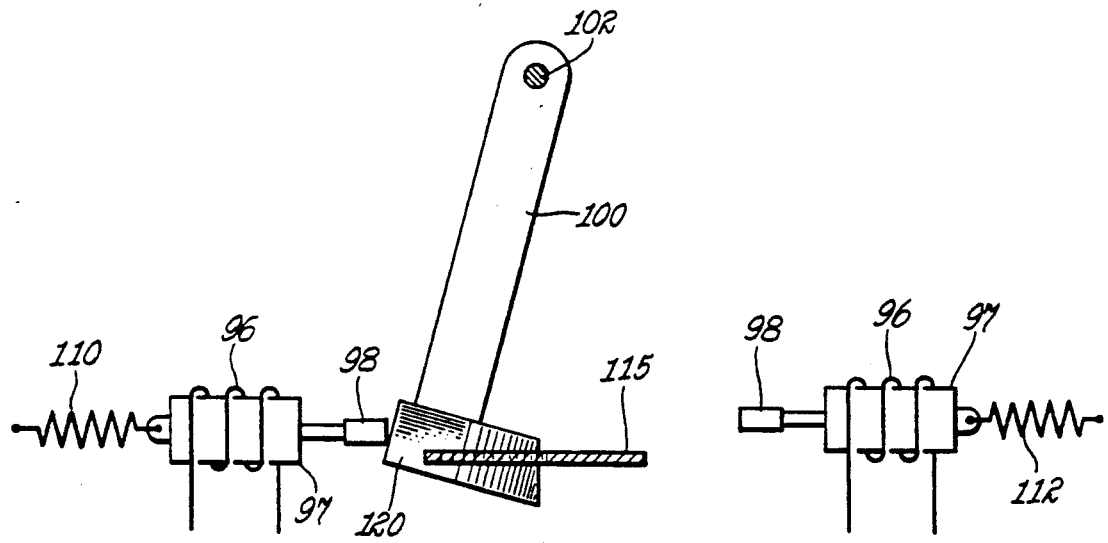
FIG. 8 is a sectional view taken along the line 8—8 of FIG. 5.
Figure 9:
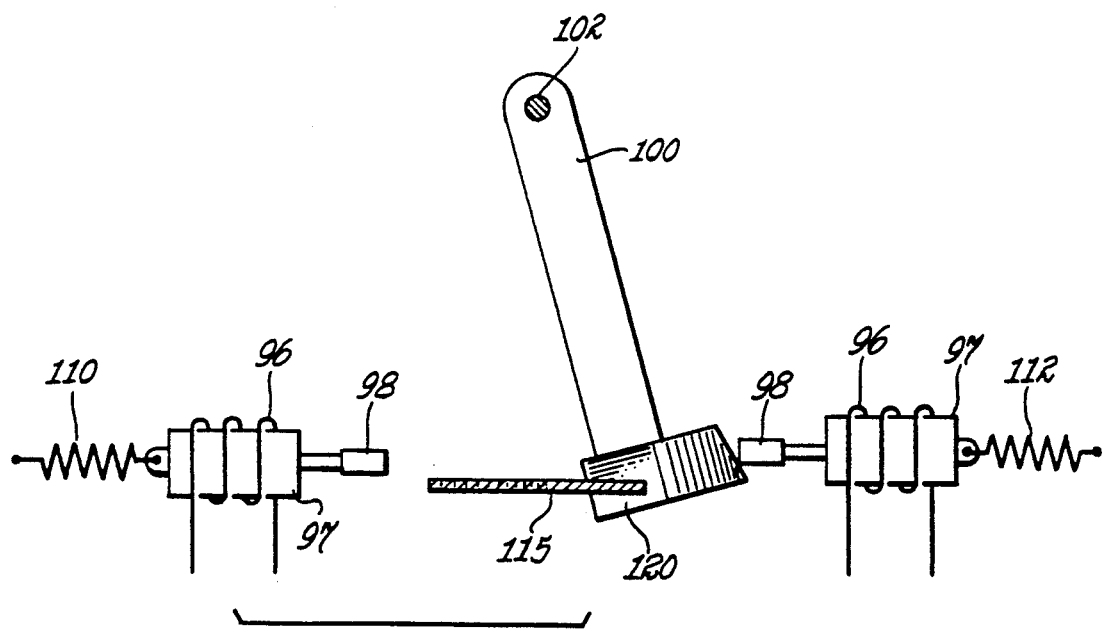
FIG. 9 is a sectional view taken along the line 9—9 of FIG. 6.

Horizontal motion of the armature of the left-handed solenoid actuator 92 is utilized for lifting the shutter 74 from its light-blocking position of FIG. 5 into its non-blocking position of FIG. 6; and horizontal motion of the armature of the right-hand solenoid actuator 94 is utilized for effecting downward motion of the shutter from its non-blocking position of FIG. 6 into its blocking position of FIG. 5. For controlling the shutter 74 in this manner in response to operation of the two solenoids, we provide in a location between the two solenoids force-transmitting means comprising an intermediate member, or arm, 100 that is pivotally mounted on a stationary pivot 102 fixed to the base plate 70, as best seen in FIGS. 7, 8, and 9. The arm 100 is movable in a horizontal plane about its pivot pin 102 into ether of two extreme positions, which positions are determined by the solenoid plungers 98 acting as stops. FIG. 8 shows the arm in one of these extreme positions, and FIG. 9 shows it in the other of these extreme positions.

When the left-hand solenoid 92 is energized to drive its armature 97 to the right from its position of FIGS. 5 and 8, the plunger 98 of the armature acts against the arm 100 to drive the arm counter-clockwise about pivot 102 from its position of FIG. 8 into its position of FIG. 9. When such action is completed, the solenoid coil 96 is deenergized, disabling the solenoid, and allowing the armature 97 to be returned to its FIG. 8 position by a suitable reset spring 110, but the arm 100 remains in the displaced position of FIG. 9. Return motion of the arm 100 from its position of FIG. 9 to its position of FIG. 8 is effected by energizing the right-hand solenoid 94 to cause its armature to drive the arm 100 in a clockwise direction back to its position of FIG. 8. When such action is completed, the coil 96 of the right-hand solenoid 94 is deenergized, disabling this solenoid and allowing its armature to be returned to its position of FIG. 9 by a suitable reset spring 112.

For producing vertical motion of the shutter 74 in response to the above-described pivotal motion of the arm 100 in a horizontal plane, the front leg 74b of the shutter is provided with an extension 115 that has a specially shaped lower edge 117 that cooperates with a specially shaped upper edge 119 of an outer portion 120 of the arm 100. More specifically, the lower edge 117 of shutter extension 115 has an inclined portion 122 and a horizontal portion 124 immediately to the right of inclined portion 122, as seen in FIGS. 5 and 6. For engaging these edge portions 122 and 124, the outer portion 120 of arm 100 has an inclined upper surface region 125 and a horizontal upper surface region 127 located immediately to the left of inclined surface region 125. The edges 117 and 119 may be thought of as cams, as will be apparent from the following description of their operation.

When the outer end 120 of the arm 100 is moved to the right from its position of FIG. 5, the inclined surface region 125 on the arm slides underneath the inclined edge portion 122 of shutter extension 115 and thus provides a wedging, or camming, action that lifts the shutter as desired. When the outer end 120 of the arm 100 has moved sufficiently to the right, the horizontal lower surface region 127 on the arm moves into engagement with the horizontal edge portion 124 on the shutter extension 115 and thus holds the shutter in its raised non-blocking position shown in FIG. 6.

When the outer end 120 of the arm 100 is moved to the left from its position of FIG. 6 back to its position of FIG. 5, the shutter 74 moves downwardly from its non-blocking position of FIG. 6 to its blocking position of FIG. 5. No such downward motion of the shutter occurs while the horizontal surface regions 127 and 124 are still in engagement during the first part of return movement of the arm 100, 120, but when inclined surface region 125 moves underneath inclined edge region 122, the shutter becomes free to move downward. The motivating force for such downward motion of the shutter is a combination of gravity and of spring force developed by the then-bent resilient upper leg 74a of the shutter. When the arm 100, 120 nears the end of its return movement to its position of FIG. 5, the shutter will have moved through its full downward stroke into its light-blocking position of FIG. 5.

It will be apparent that both of the above-described indicating devices can provide a very high contrast ratio, i.e., the ratio of light output from the device when in its non-blocking state to the light output when in its blocking state. In this regard, it should be noted that in each of these devices the shutter portion that blocks light from each output end 31 of the light guide is opaque and, when in its blocking position, is located in close proximity to the output end 31 so that very little light is permitted to pass through the shutter to the associated lens during this interval. On the other hand, when the shutter is in its non-blocking position, it allows free passage of light from the output end of each light guide to the associated lens.

It will also be apparent that our indicating devices are highly efficient inasmuch as they permit passage between the output end of the light guide and the lens of essentially 100 per cent of the light emanating from the output end when the shutter is in its non-blocking position (of FIG. 4 or FIG. 6).

Although not illustrated, it is to be understood that the light source 12 of FIG. 1 can serve as the light source for other components of the automobile lighting system, such as additional turn-signal indicators and emergency flashers, additional side markers and brake-light indicators, headlamps, taillamps, interior lights, etc. When thus utilized, the light source 12 can be coupled to these additional components via additional light guides corresponding to the illustrated light guides 18 for transmitting light from the source to these components.

While the indicating device of FIGS. 1-4 is especially adapted for use as a repetitively-flashing type of indicating device such as a turn-signal indicator or a flasher-type emergency indicator as described hereinabove, it can also be used for other types of indicators. For example, it can be used for side markers and brake-light indicators, provided the solenoid 50 is destined for extended energization. The device of FIGS. 5-9, while especially adapted for applications calling for extended "on" periods, such as the side marker and brake-light indicators referred to above, can be used for other indicator applications, such as those of the rapidly-flashing type referred to above.

While we have described particular embodiments of our invention, it will be obvious to those skilled in the art that various changes and modifications may be made without departing from our invention in tis broader aspects; and we, therefore, intend herein to cover all such changes and modifications as fall within the true spirit and scope of our invention.

What we claim is:

1. In a lighting system for an automobile that comprises: (i) a light source that develops light when in an "on" state., (ii) an elongated light guide that has an input end for receiving light from said source and an output end to which the received light is transmitted by said light guide, (iii) an indicating device at said output end for controlling the passage of light from said output end to a location exterior to the automobile, and (iv) a lens located between said indicating device and said exterior location for receiving light passing through said indicating device from said light guide output end, said indicating device comprising:
  (a) a shutter having a substantially opaque portion, a light-blocking position in which said substantially opaque portion blocks the passage of light from said output end to said lens, and a non-blocking position in which light is allowed to pass through said indicating device to said lens, and
  (b) shutter-actuating means for shifting said shutter between said light-blocking position and said non-blocking position while said light source remains in said "on" state.

2. The lighting system of claim 1 in which:
  (a) said shutter-actuating means comprises (i) spring means for biasing said shutter toward said light-blocking position and (ii) an actuator that drives said shutter from said light-blocking position into said non-blocking position and is thereafter disabled to allow said spring means to return the shutter to said non-blocking position, and
  (b) said shutter is repetitively operated between said light-blocking and said non-blocking positions by said shutter-actuating means to cause light to pass in repetitive flashes between said light guide output end and said lens.

3. The lighting system of claim in which said shutter has an aperture extending therethrough which is out of alignment with said output end of the light guide when the shutter is in its light-blocking position and is substantially in alignment with said output end when the shutter is in its non-blocking position.

4. The lighting system of claim 2 in which said shutter has an aperture extending therethrough which is out of alignment with said output end of the light guide when the shutter is in its light-blocking position and is substantially in alignment with said output end when the shutter is in its non-blocking position.

5. The lighting system of claim 1 in which :
  (a) said shutter-actuating means comprises two actuators, a first one of which when enabled, supplies force for driving said shutter from said light-blocking position toward said non-blocking position, and a second one of which, when enabled, effects return of said shutter from its non-blocking position into its light-blocking position,
  (b) said shutter-actuating means further comprises force-transmitting means operable by either of said two actuators (i) for applying force from said first actuator to said shutter to drive said shutter from its light-blocking position to its non-blocking position when said first actuator is enabled, (ii) for holding said shutter in its non-blocking position when said first actuator is disabled, and (iii) for acting when operated by said second actuator upon enablement to allow return of said shutter from its non-blocking position to its light-blocking position.

6. The lighting system of claim 5 in which:
  (a) said actuators apply force in substantially opposite directions when enabled, and
  (b) said force-transmitting means comprises an intermediate member disposed between said actuators, movable in one direction when operated by said first actuator, and movable in an opposite direction when operated by said second actuator.

7. The lighting system of claim 6 in which said shutter-actuating means further comprises cam means between said intermediate member and said shutter that (i) operates said shutter from its light-blocking position to its non-blocking position in response to operation of said intermediate member by said first actuator and (ii) holds said shutter in said non-blocking position when said first actuator is disabled after having driven said shutter into said non-blocking position, and (iii) allows return of said shutter to said light-blocking position in response to operation of said intermediate member by said second actuator.

8. The lighting system of claim 1 in which said shutter actuating means comprises (i) spring means for biasing said shutter toward said light-blocking position and (ii) an actuator that drives said shutter from said light-blocking position to said non-blocking position and is thereafter disabled to allow said spring means to return the shutter to said non-blocking position.

* * * * *